(12) United States Patent
Shin et al.

(10) Patent No.: US 7,801,101 B2
(45) Date of Patent: Sep. 21, 2010

(54) APPARATUS AND METHOD FOR COMPENSATING FORWARD LINK RAIN ATTENUATION BASED ON ADAPTIVE TRANSMISSION SCHEME FOR INTERACTIVE SATELLITE TRANSMISSION SYSTEM

(75) Inventors: Minsu Shin, Daejon (KR); Joon-Gyu Ryu, Daejon (KR); Hoon Jeong, Daejon (KR); Ho-Jin Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 896 days.

(21) Appl. No.: 10/892,679

(22) Filed: Jul. 15, 2004

(65) Prior Publication Data
US 2005/0141472 A1    Jun. 30, 2005

(30) Foreign Application Priority Data
Dec. 27, 2003    (KR)    ...................... 10-2003-0098375

(51) Int. Cl.
*H04B 7/216* (2006.01)
(52) U.S. Cl. .................... 370/342; 455/450; 455/432.2; 455/431; 455/12.1
(58) Field of Classification Search ....... 455/3.01–3.06, 455/427–430, 12.1, 450, 432.2; 370/342
See application file for complete search history.

(56) References Cited

U.S. PATENT DOCUMENTS 6,442,143 B1    8/2002    Corry
6,574,794 B1*   6/2003    Sarraf .......................... 725/63
6,577,847 B2    6/2003    Van Willigen
6,643,524 B1*   11/2003   Ishii et al. .................... 455/560

FOREIGN PATENT DOCUMENTS

KR    1020020028663         4/2002
KR    1020020051360 A       6/2002

OTHER PUBLICATIONS

P. Takats et al., "A rain Fade Mitigation Scheme For The Forward Path of DVB-RCS Systems", Amerian Institute of Aeronautics and Astronautics, 21st Int'l Comm. Satellite Systems Conf. and Exhibit, AIAA 2003-2264 (pp. 1-11).

* cited by examiner

*Primary Examiner*—Patrick N Edouard
*Assistant Examiner*—Chuck Huynh
(74) *Attorney, Agent, or Firm*—Blakely, Sokoloff, Taylor & Zafman LLP

(57) ABSTRACT

Provided are a forward link rain attenuation compensating apparatus using an adaptive transmission scheme in an interactive satellite communication system and a method thereof. The apparatus separates the mobile stations into clear-sky mobile stations and mobile stations in the state of rain attenuation and makes the clear-sky mobile stations receive data having a high data transmission efficiency at a high-speed while making the rain attenuation mobile stations receive the data continuously although the data transmit rate is low by making each of the two kinds of mobile stations receive data frames of a different transmission method, and provides a method therefor. The apparatus includes: a resource manager, a transmitting data format converter, a forward modulator, a backward demodulator, a receiving data format converter.

6 Claims, 5 Drawing Sheets

FIG. 2C

| CS class | RA class |
|---|---|
| RMT = 180; | RMT = 280; |
| SCT = 181; | SCT = 281; |
| FCT = 182; | FCT = 282; |
| TCT = 183; | TCT = 283; |
| SPT = 184; | SPT = 284; |
| CMT = 185; | CMT = 285; |
| TBTP = 186; | TBTP = 286; |
| TIM = 188; | TIM = 288; |
| Traffic = 150; | Traffic = 250; |
| PCR = 160 | PCR = 260 |

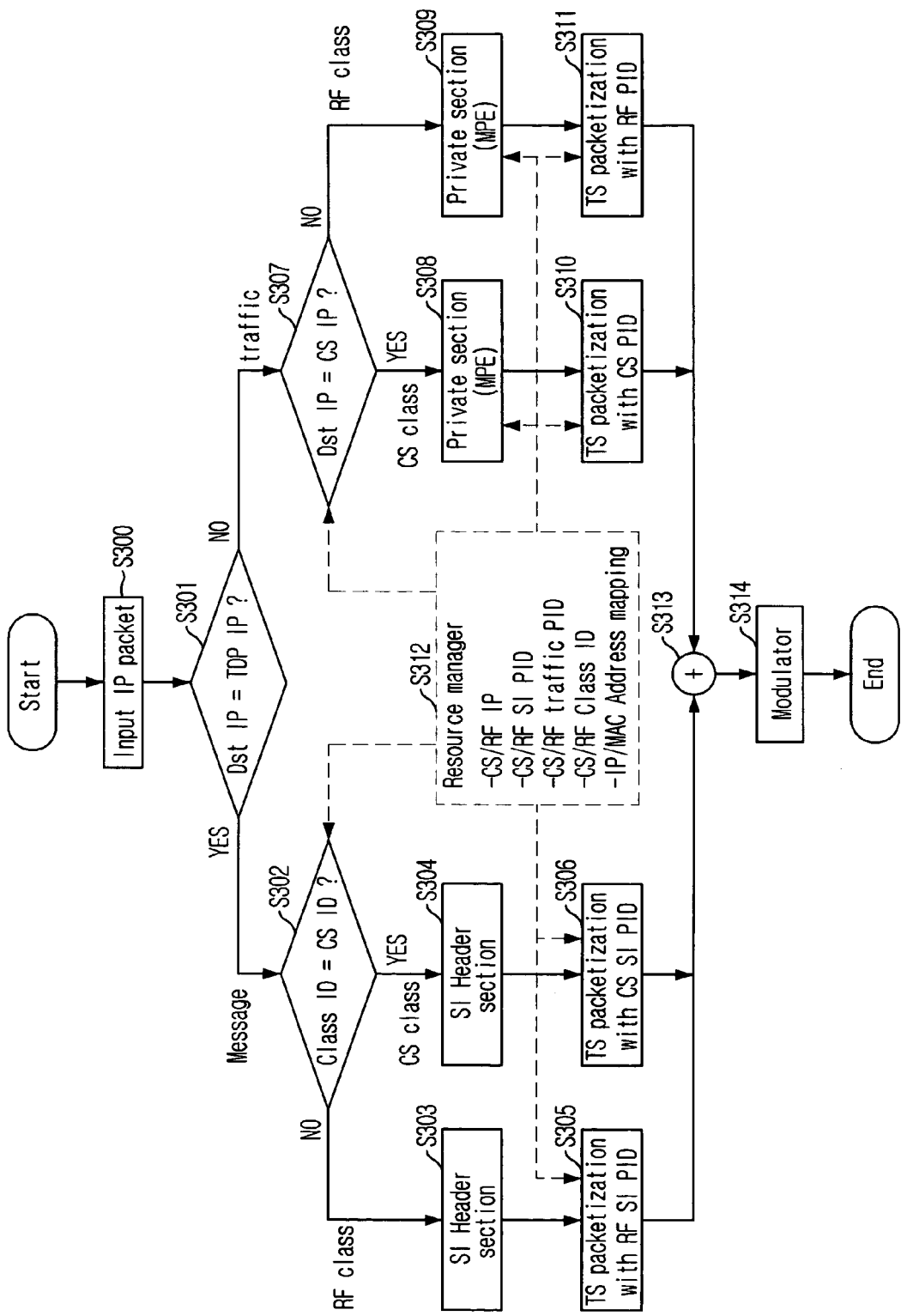

APPARATUS AND METHOD FOR COMPENSATING FORWARD LINK RAIN ATTENUATION BASED ON ADAPTIVE TRANSMISSION SCHEME FOR INTERACTIVE SATELLITE TRANSMISSION SYSTEM

FIELD OF THE INVENTION

The present invention relates to an apparatus and method for compensating forward link rain attenuation based on an adaptive transmission scheme in an interactive satellite transmission system that occurs on a forward link from a central station to a mobile station. More particularly, the present invention relates to a forward link rain attenuation compensating apparatus using an adaptive transmission scheme in an interactive satellite transmission system, the apparatus that can provide a service to a rain attenuation mobile station while not scarifying a transmission data rate for a mobile station by modifying only a transmission method of data frames transmitted to a mobile station, multiplexing the modified transmission method with data frames transmitted to clear-sky mobile stations and transmitting the multiplexed data frames, if rain attenuation occurs in a transmission link between a central station and a mobile station of a region in an interactive satellite communication system formed of one central station and a plurality of mobile stations, and relates to a method therefor.

DESCRIPTION OF RELATED ART

A rain attenuation compensating method is a scheme that can maintain a link continuously in a low signal level and provide a service by modifying a modulation/demodulation method or coding method if signal quality is degraded due to rain attenuation.

Generally, rain attenuation compensating methods has two types: a fixed method and an adaptive method.

According to the fixed method, resources are allocated fixedly to compensate rain attenuation. For example, there is a diversity method in which an additional earth station, satellite, and frequency are reserved to be used when rain attenuation occurs. Since rain attenuation occurs at a low occurrence rate, it is not efficient to prepare additional resources for it in advance. Therefore, the adaptive method that converts resources in a power-efficient way only when rain attenuation occurs is more effective.

An adaptive modulation/demodulation method makes communication possible, even though the intensity of a received signal is reduced due to rain attenuation, by changing a modulation method into a modulation method with a low bit-per-symbol rate when signals are attenuated due to rain attenuation and thus reducing the signal level required for signal demodulation. Therefore, in case where M-ary Phase Shift Keying (PSK) is used, 9-PSK is used during the ordinary time and then it is switched into Quadrature Phase Shift Keying (QPSK) or Binary Phase Shift Keying (BPSK) when attenuation occurs.

According to an adaptive encoding/decoding method, although rain attenuation occurs and thus the signal quality is degraded due to the rain attenuation, the actual data transmit rate is reduced and data can be received by raising the code rate of the encoding method and using many error correction bits.

However, the above signal compensating method is mainly used for the compensation of rain attenuation occurring on a return link. Since communication is established one-to-one between a mobile station that transmits data and a central station that receives the data on the return link, the change in the transmission method in the mobile station hardly affects other mobile stations. However, since one central station for transmitting data are connected with a plurality of mobile stations receiving the data on the forward link, the change in the transmission method of the central station affects all the mobile stations. This method is inefficient because the data transmit rate of the clear-sky mobile stations which occupy the major part of the entire mobile stations should be reduced in order to maintain service links to the mobile stations in the state of rain attenuation, which are relatively the minor.

Therefore, required is a method that can change the transmission method adaptively to the state of a link to compensate for the rain attenuation on the forward link, just as the adaptive method does, and provide a service to the mobile stations in the state of rain attenuation while not affecting the clear-sky mobile stations.

SUMMARY OF THE INVENTION

It is, therefore, an object of the present invention to provide a forward link rain attenuation compensating apparatus using an adaptive transmission scheme in an interactive satellite communication system, and a method therefor. The apparatus that separates the mobile stations into clear-sky mobile stations and mobile stations in the state of rain attenuation and makes the clear-sky mobile stations receive data having a high data transmission efficiency at a high-speed while making the mobile stations in the state of rain attenuation receive the data continuously although the data transmit rate may be low by making each of the two kinds of mobile stations receive data frames of a different transmission method.

In accordance with an aspect of the present invention, there is provided a forward link rain attenuation compensating apparatus using an adaptive transmission scheme in an interactive satellite communication system, including: a resource managing unit for managing limited resources of a central station and mobile stations which transmit and receive data through a satellite network, the resource managing unit being connected with an external Internet service provider; a transmitting data format converting unit for converting data transmitted from the central station to the mobile stations into Moving Picture Experts Group (MPEG)-2 transmission stream (TS) packets, which are standard forms for satellite transmission; a forward modulating unit for modulating data outputted from the transmitting data format converter according to forward link satellite standards; a backward demodulating unit for demodulating a backward signal transmitted from the mobile stations; and a receiving data format converting unit for converting data outputted from the backward demodulating unit into Internet Protocol datagram.

In accordance with another aspect of the present invention, there is provided a forward link rain attenuation compensating method using an adaptive transmission scheme in an interactive satellite communication system, comprising the steps of: a) receiving an Internet Protocol (IP) packets in a transmitting data format converter and checking if the IP packet is message data or traffic data according to a destination IP address of the received IP packet; b) if the received IP packet is message data, examining a class identifier of the message IP packet and, if the message IP packet belongs to a rain attenuation class, forming a service information (SI) header section, forming a Moving Picture Experts Group 2 (MPEG-2) transmission stream (TS) packet by using a rain attenuation SI PID; or if the message IP packet belongs to a clear sky class, forming a service information (SI) header section, forming an MPEG-2 TS packet by receiving a clear sky SI PID; c) if the received IP packet is traffic data, checking a destination IP address, confirming that a mobile station of the IP address belongs to a clear sky class, forming a multi-protocol encapsulation (MPE) section which is classified as a clear sky class and used for processing traffic data, forming an MPEG-2 TS packet by using a PID allocated to the clear sky traffic data; or if the mobile station of the IP address belongs to a rain attenuation class, forming an MPE section by receiving hardware address of the rain attenuation-class mobile station from the resource manger, forming an MPEG-2 TS packet by using a PID allocated to the rain attenuation traffic data; and d) multiplexing and modulating the MPEG-2 TS packets formed in the steps b) and c).

BRIEF DESCRIPTION OF THE DRAWINGS

The above and other objects and features of the present invention will become apparent from the following description of the preferred embodiments given in conjunction with the accompanying drawings, in which:

FIGS. 2A to 2C are block diagrams describing the data processing in the forward link rain attenuation compensation apparatus in accordance with an embodiment of the present invention; and FIG. 3 is a flowchart describing a forward link rain attenuation compensating method in accordance with an embodiment of the present invention.

DETAILED DESCRIPTION OF THE INVENTION

Other objects and aspects of the invention will become apparent from the following description of the embodiments with reference to the accompanying drawings, which is set forth hereinafter.

Figure 1:
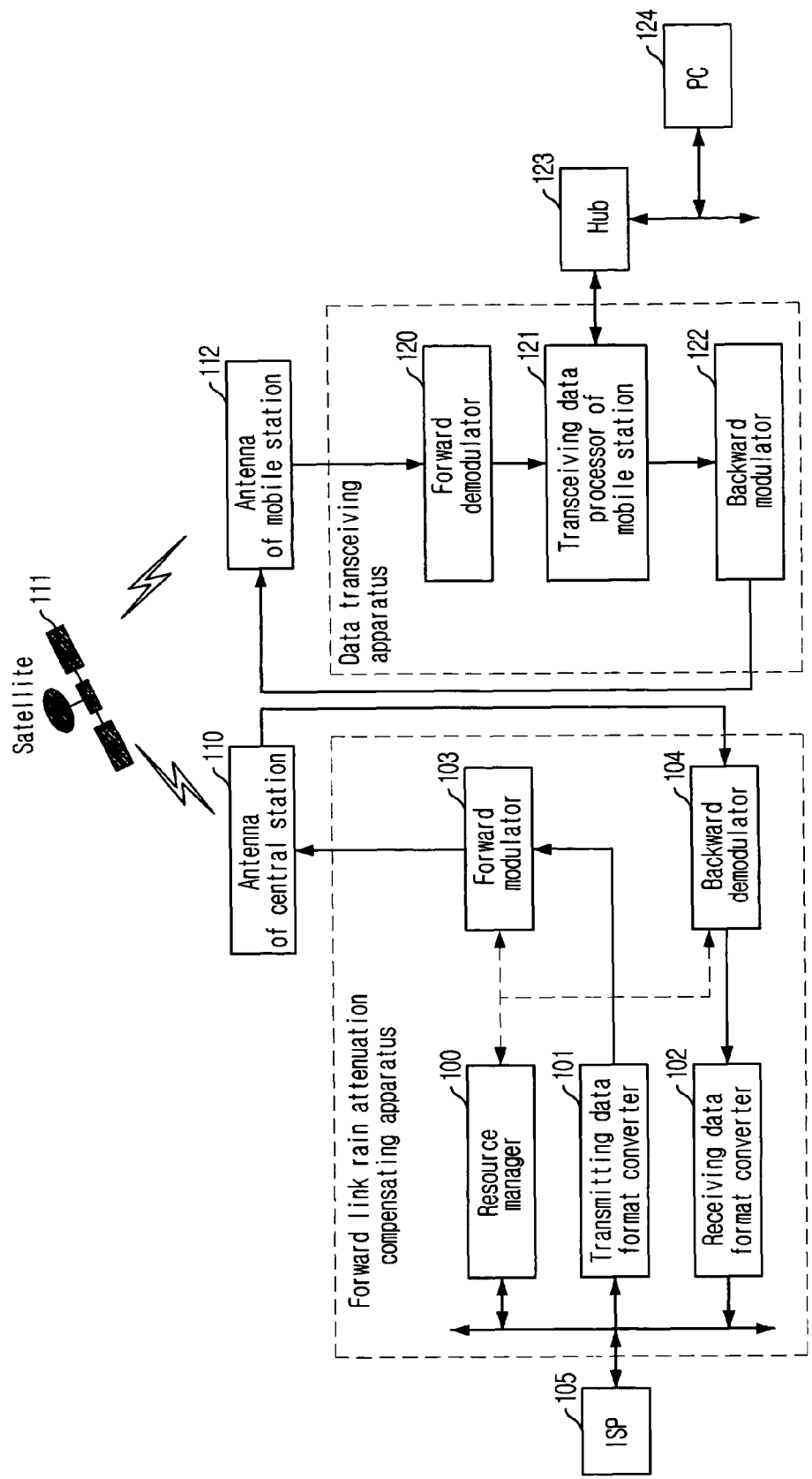
FIG. 1 is a block diagram illustrating a forward link rain attenuation compensation apparatus in accordance with an embodiment of the present invention.

FIG. 1 is a block diagram illustrating a forward link rain attenuation compensating apparatus in accordance with an embodiment of the present invention.

A central station includes a forward link rain attenuation compensating apparatus and a central station antenna 110. A mobile station includes a data transceiving apparatus and a mobile station antenna 112. The forward link rain attenuation compensating apparatus includes a resource manager 100, a transmitting data format converter 101, a receiving data format converter 102, a forward modulator 103, and a backward demodulator 104. The data transceiving apparatus includes a forward demodulator 120, a mobile station transceiving data processor 121, a backward modulator 122. The central station receives data from an Internet service provider 105. The mobile station is connected with a personal computer (PC) 124 through a hub 123. A reference number '111' denotes a satellite.

The forward link rain attenuation compensating apparatus of the present invention is connected with the external ISP 105 to provide an Internet-based service.

The resource manager 100 manages limited amount of resources of the central station and the mobile station which communicates data with each other through a satellite network, efficiently. The transmitting data format converter 101 converts the data transmitted from the central station to the mobile station into Moving Picture Experts Group 2 (MPEG-2) transmission stream (TS) packets, a standard for satellite transmission.

The forward modulator 103 performs Quadrature Phase Shift Keying (QPSK) modulation and Forward Error Correction (FEC), which are standards for forward satellite transmission, upon the data outputted from a data processor of the central station. The backward demodulator 104 demodulates backward signals from the mobile station. User data transmitted from the mobile station, which are outputted from the backward demodulator 104, are transmitted in the form of the MPEG-2 TS or asynchronous transmission mode (ATM) cells. The receiving data format converter 102 converts the user data in the form of MPEG-2 TS or ATM cells into Internet Protocol (IP) datagrams.

The purpose of the present invention is to provide a service incessantly to mobile stations in the state of rain attenuation, although the data transmit rate may be low, while providing the service to clear-sky mobile stations at a high data transmit rate, in case where both clear-sky mobile stations and the mobile stations in the state of rain attenuation exist together. To provide this service, the mobile station should measure the intensity of its receiving signals and transmit it to the central station. The central station determines whether to change a transmission method of data to be transmitted to the mobile station based on the information on the intensity of the receiving signals in the mobile station, transmits the determined transmission method and the information on the mobile station to the resource manager 100 so that the system management and operation could be performed in general.

In the forward link rain attenuation compensating apparatus, the resource manager 100 checks if there are available resources when a user logs in a website, allocates requested resources, and maintains the optimum resource allocation state by using an efficient allocation method when resources are allocated additionally. It also distinguishes the mobile stations in the state of rain attenuation from clear-sky ones by using the information on the intensity of receiving signals of the mobile station on line, and performs control to transmit data to the mobile stations by using a transmission method determined specifically.

In the forward link rain attenuation compensating apparatus, the transmitting data format converter 101 receives data requested by a subscriber from the ISP 105, encapsulates the data in a Multi-Protocol Encapsulation (MPE) method, a standard for digital video broadcast (DVB) data broadcasting, to transmit the received data to the subscriber who requested for it by using an IP address allocated to the subscriber and a hardware address given to the data transmitting apparatus of the mobile station. Then, the transmitting data format converter 101 converts the encapsulated data into MPEG-2 TS packets. It also receives data from the resource manager 100 and transmits the data with a packet identifier (PID) according to the destination address of each packet so that a different transmission method can be used selectively in the forward modulator based on the data. For this, the transmitting data format converter 101 should have data on the IP addresses of all mobile stations, transmission class, i.e., rain attenuation or clear-sky transmission, and PID according to each transmission class in a connected form of {(IP address), (transmission class), (PID)}. The data can be modified from time to time according to the control of the resource manager 100.

The receiving data format converter 102 receives data of the mobile station from the backward demodulator 104 and among the data, transmits traffic data to the router of the central station, transmits control data used for requesting resources and reporting the state of a mobile station to the resource manager of the system. Since the data transmitted from the mobile station are in the form of ATM cells or MPEG-2 TS packets, the receiving data format converter 102 converts the data into IP packets.

The forward modulator 103 receives service control information of the resource manager 100 and traffic data of the transmitting data format converter 101, performs modulation and channel coding, and transmits the modulated and coded data to the antenna 110 of the central station. The forward modulator 103 basically follows a structure suggested in the digital video broadcasting S-2 (DVB-S2) standards and it may include an additional module to process the traffic data according to transmission classes.

The backward demodulator 104 receives signals transmitted from the mobile station, converts them into baseband signals through demodulation and channel decoding, and outputs the baseband signals to the receiving data format converter 102.

The transceiving data processor 121 divides the data transmitted from the central station into control data and traffic data, manages network environment with the PC 124, and converts the transmission layer data format of transceiving data.

Figure 2A:
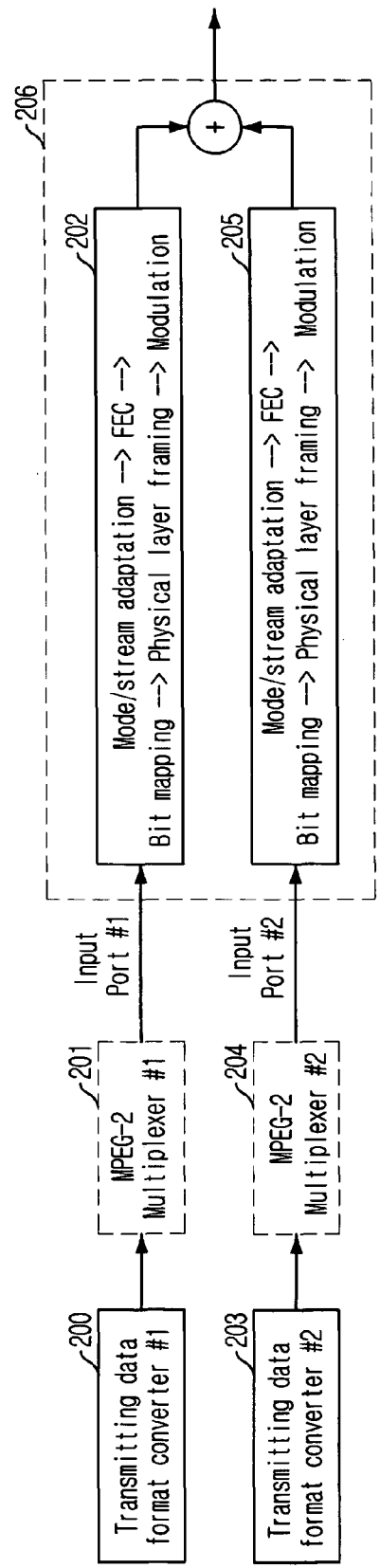
Figure 2B:
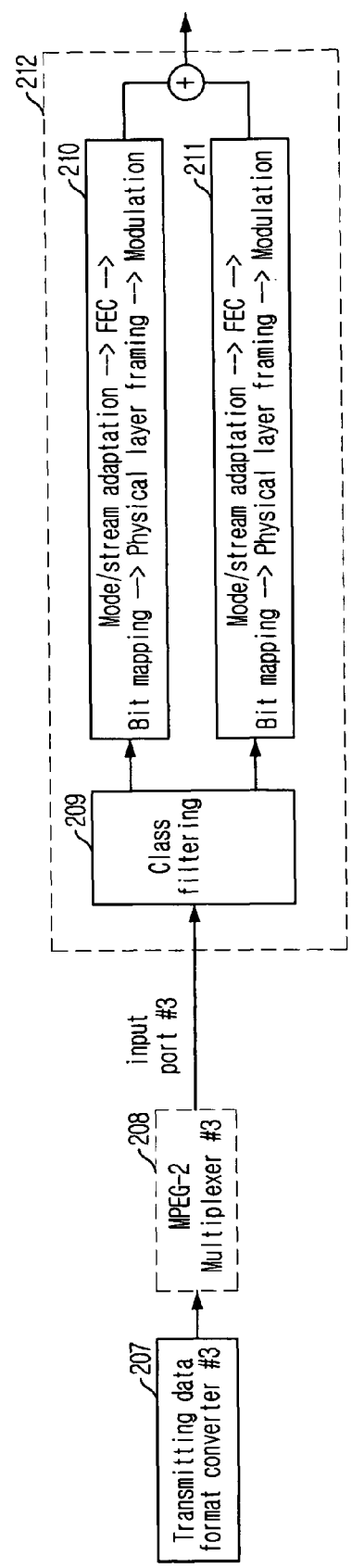

FIGS. 2A to 2C are block diagrams describing the data processing in the forward link rain attenuation compensation apparatus in accordance with an embodiment of the present invention. In the data processing structure, data corresponding to forward link rain attenuation compensating apparatuses of two transmission classes, i.e., rain attenuation class and clear-sky class, are discriminated and processed.

In the drawings, first, second and third transmitting data format converters 200, 203 and 207, which are connected to the routers of the central station, converts data to be transmitted from an external ISP to a mobile station into MPEG-2 TS packets, a data standard for satellite transmission. It converts the IP packets inputted by receiving IP address and transmission class of the data transceiving apparatus of each mobile station and packet identifier (PID) of the data of each transmission class from the resource manager 100 into MPEG-2 TS packets.

MPEG-2 multiplexers 201, 204, and 208 multiplex audio/video data outputted from an external broadcasting station or an MPEG-2 encoder installed inside and the IP packets inputted from the transmitting data format converters 200, 203 and 207.

Reference numbers "206" and "212" denotes a digital video broadcast (DVB) S-2 forward modulator. The reference number "206" shows a structure where transmission streams are divided for a plurality of input ports. The reference number "212" shows a structure where a different transmission method is applied to transmission streams inputted to one input port according to the transmission class.

Meanwhile, the reference numbers "202," "205," "210," and "211" show the operation flow of a modulator, which is applied to a transmission stream, as suggested in the DVB-S2 standards.

MPEG-2 TS packets are inputted and finally modulated signals are outputted. If a plurality of transmission streams are to be processed simultaneously, the modulated signals are multiplexed and transmitted on one carrier.

FIG. 2A shows a case where each input port receives transmission stream having a different transmission class. The structure of FIG. 2A shows that the modulator supports a plurality of input ports and a different transmission method is established for each input port. The transmitting data format converter to which the data for the mobile terminal are transmitted is selected in the source manager 100 according to the transmission class determined based on the receiving intensity of each mobile terminal. For example, it is assumed that the first transmitting data format converter 200 processes streams of a clear-sky class, the second transmitting data format converter 203 processes streams of a rain attenuation class. Packets taking the IP address of a mobile terminal that the resource manager 100 determines to be a clear-sky class as a destination IP are inputted to the first transmitting data format converter 200 and converted into MPEG-2 TS packets based on the PID allocated to the clear-sky class.

FIG. 2C presents an example of PID allocation with respect to each transmission class. The IP packets discriminated in the first transmitting data format converter 200 are converted into MPEG-2 TS packets by using the PID which are allocated additionally, and inputted to a forward modulator 206 which performs DVB-S2 modulation through an MPEG-2 multiplexer 201.

Since the case of FIG. 2A can set up a different transmission method according to an input port, packets received by each input port are processed according to the pre-established transmission method, multiplexed before outputted to the forward modulator 206 and transmitted on a carrier.

FIG. 2B shows how transmission class is determined in the forward modulator 212. Since the transmission class is determined in the forward modulator 212, {(PID), (transmission class)} information should be transmitted from the resource manager 100 to the forward modulator 212. The first transmitting data format converter 207 determines a transmission class with respect to a destination IP address of each of all input packets and converts the input packets into MPEG-2 TS packets by using the PID of the transmission class. An MPEG-2 TS packet is inputted to an input port of the forward modulator and processed in the forward modulator by allocating a different transmission method according to the PID.

FIG. 3 is a flowchart describing a forward link rain attenuation compensating method in accordance with an embodiment of the present invention. It shows a process flow in the transmitting data format converter of an interactive satellite multimedia system.

For the mobile station to transmit user data to the central station, resources of time and frequency aspects are allocated by the central station. All mobile stations operate under the general network management of the central station. The central station measures receiving signal intensity of packets transmitted from each mobile terminal. The measured receiving signal intensity is transmitted to the resource manager and used to correct errors and determine whether rain attenuation has occurred or not. If it is thought that rain attenuation has occurred in a transmission path to a certain mobile terminal, the resource manger transmits data on the mobile station to the transmitting data format converter so that the data to be transmitted to the mobile station can be transmitted in a different transmission method. Consequently, it is possible to maintain transmission links by lowering the data transmit rate with respect to particular mobile stations where rain attenuation occurs and maintaining a high data transmit rate with respect to the mobile stations of a clear-sky state, and therefore forward link resources can be used optimally.

The forward link rain attenuation compensating method will be described herein with reference to FIG. 3. At step S300, IP packets are inputted to a transmitting data format converter. At step S301, it is checked whether the inputted IP packets are message data or traffic data based on the destination IP addresses of the inputted IP packets. If the destination IP addresses are the same as the IP addresses of the transmitting data format converter, the inputted IP packets are message data. Otherwise, they are recognized as traffic data.

If the inputted IP packets turn out to be message data, the class ID of the inputted IP packets is examined and if the class ID indicates the rain attenuation class, at step S303, a service information (SI) header section is formed. Then, at step S305, MPEG-2 TS packets are formed by utilizing rain fad service information PID. The PID is inputted from the resource manager 312. If the class ID indicates clear-sky class, at step S304, an SI header section is formed. Then, an MPEG-2 TS packet is formed by receiving clear-sky service information PID.

Meanwhile, at the step S301, if the inputted IP packets turn out to be traffic data, the destination IP address is examined and if the destination IP address is the IP address of a clear-sky mobile station, at step S308, a Multiprotocol Encapsulation (MPE) section which is classified as the clear-sky class and used for traffic processing is formed. Here, the hardware address, i.e., Media Access Control (MAC) address, of the corresponding mobile station is used. The MAC address is transmitted from the resource manager 312. Then, at step S310, an MPEG-2 TS packet is formed by utilizing PID allocated to the clear-sky traffic data. The IP addresses of the mobile stations which belong to a clear-sky class or a rain attenuation class are used after being received from the resource manger 312.

Meanwhile, if a mobile terminal is classified as a rain attenuation class, at step S309, the MAC addresses of the rain attenuation-class mobile stations are received from the resource manager to thereby form an MPE section. Subsequently, at step S311, MPEG-2 TS packets are formed by utilizing PID allocated to rain attenuation traffic data. At step S313, the MPEG-2 TS packets formed through the steps S305, S306, S310 and S311 are multiplexed and, at step S314, the multiplexed MPEG-2 TS packets are outputted to the forward modulator.

As described above, the forward link rain attenuation compensating method of the present invention can be realized as a program and saved in a computer-readable recording medium, such as CD-ROM, RAM, ROM, floppy disks, hard disks, magneto-optical disks and the like.

The method of the present invention can compensate rain attenuation in the downlink of the forward link in a multimedia satellite communication system using a high frequency band over a Ka band, which cannot be achieved in conventional technologies, thus improving the overall system performance.

While the present invention has been described with respect to certain preferred embodiments, it will be apparent to those skilled in the art that various changes and modifications may be made without departing from the scope of the invention as defined in the following claims.

What is claimed is:

1. A forward link rain attenuation compensating apparatus using a physical layer adaptive transmission frame scheme over one carrier in an interactive satellite communication system, comprising:
 a resource managing means for managing limited resources of a central station and mobile stations which transmit and receive data through a satellite network, the resource managing means being coupled to an external Internet service provider;
 a transmitting data format converting means for converting data transmitted from the central station to the mobile stations into Moving Picture Experts Group (MPEG)-2 transmission stream (TS) packets;
 a forward modulating means for modulating data outputted from the transmitting data format converting means according to forward link satellite standards and outputting modulated signals, the forward modulating means supports a plurality of different transmission methods and transmits the modulated signals on the one carrier;
 a backward demodulating means for converting a backward signal received from the mobile stations into baseband signals through demodulation and channel decoding and for outputting the baseband signals, the baseband signals being in the form of MPEG-2 TS or ATM cells; and
 a receiving data format converting means for converting the baseband signals outputted from the backward demodulating means into Internet Protocol datagram,
 wherein the forward modulating means uses one of the plurality different transmission methods based on information on the mobile station,
 wherein the resource manager checks if there are available resources when a user logs in, allocates required resources, maintains a condition of optimum resource allocation until resources are requested additionally, discriminates mobile stations of rain attenuation by utilizing data on receiving signal intensities of the mobile stations on line, and performs control so that data to be transmitted to the mobile stations can be transmitted in pre-determined transmission methods by transmitting the data on the mobile stations to the transmitting data format converting means,
 wherein the transmitting data format converting means keeps data on transmission classes, which include a rain attenuation class and a clear sky class.

2. The apparatus as recited in claim 1, wherein the transmitting data format converting means receives data requested by a user from the Internet service provider, encapsulates the data in conformity to digital video broadcast (DVB) data broadcasting standards by utilizing an Internet Protocol (IP) address allocated to the user and a hardware address given to a mobile station of the user, converts the encapsulated data into MPEG-2 TS packets, receives information on the mobile station from the resource managing means, and transmits the MPEG-2 TS packets by using different packet identifiers (PID) according to a destination address of each receiving packet so that the forward modulating means can use a different transmission method optionally by using the information on the mobile station.

3. The apparatus as recited in claim 1, wherein the transmitting data format converting means additionally keeps data on IP addresses, transmission classes, and PID based on each transmission class and the data can be varied at any time based on control information of the resource managing means.

4. The apparatus as recited in claim 1, wherein the receiving data format converting means receives data transmitted from a mobile station in the backward demodulating means, transmits traffic data to a router of the central station, transmits the control data used for requesting resources and reporting conditions of the mobile station to the resource managing means, and converts MPEG-2 TS packets or asynchronous transmission mode (ATM) cells received from the mobile station into IP packets.

5. The apparatus as recited in claim 1, wherein the forward modulating means receives service control data of the resource managing means and traffic data of the transmitting data format converting means, performs modulation and channel coding, transmits the resultant data to an antenna or system of the central station, the forward modulating means being in conformity to the digital video broadcast (DVB) S2 standards.

6. The apparatus as recited in claim 1, wherein the backward demodulating means receives a signal transmitted from the mobile station, performs demodulation and channel decoding, converts the resultant signal into a baseband signal, and outputs the baseband signal to the receiving data format converting means.

* * * * *